United States Patent [19]

Post

[11] Patent Number: 4,858,981

[45] Date of Patent: Aug. 22, 1989

[54] VEHICLE LOADING ATTACHMENT

[76] Inventor: Herman D. Post, 7 Chester Dr., Great Neck, N.Y. 11021

[21] Appl. No.: 208,765

[22] Filed: Jun. 20, 1988

[51] Int. Cl.⁴ ............ B62D 25/10

[52] U.S. Cl. ............ 296/76; 60/477; 414/540

[58] Field of Search ............ 296/76; 414/540, 462, 414/463, 543; 60/477; 91/417 R

[56] References Cited

U.S. PATENT DOCUMENTS

| | | | |
|---|---|---|---|
| 3,909,060 | 9/1975 | Katayama | 296/76 |
| 4,127,200 | 11/1978 | Mann | 424/543 |
| 4,221,528 | 9/1980 | Gordas | 414/540 |
| 4,406,574 | 9/1983 | Riley | 414/543 |
| 4,779,845 | 10/1988 | Bartesch et al. | 296/76 |

*Primary Examiner*—Robert R. Song
*Attorney, Agent, or Firm*—Robert W. Fiddler

[57] ABSTRACT

An attachment and method to implement loading of a vehicle having a hinged storage compartment closure member such as a trunk lid or hatchback on an automobile by utilizing the closure member as a lifting lever. The conventional hinged trunk lid or hatchback is formed with one or more hook or other material engaging members at the free end of the lid or hatchback remote from the conventional hinge mounting edge of the lid or hatchback. A piston-cylinder assembly having fixed capacity energy storing means in the form of a fixed charge fluid chamber and a variable capacity energy storing means in the form of a variable charge fluid chamber is positioned between the vehicle body and the lid or hatchback, and fluid from a fluid system is selectively directed to the variable charge fluid chamber in the cylinder to displace the piston against the trunk or hatchback lid to lift same, whereby any material engaged by the hook can be lifted to a position over the vehicle storage compartment. Alternatively, the piston-cylinder assembly may function to counterbalance the weight of the lid or hatchback when fluid is absent from the variable charge fluid chamber in the piston-cylinder assembly, allowing compressed gas in the closed fixed charge fluid chamber to act as a counterbalance for the lid.

19 Claims, 2 Drawing Sheets

VEHICLE LOADING ATTACHMENT

This invention relates to the art of vehicle loading attachments, and more particularly to improved means including both method and apparatus implementing the loading of a vehicle, and additionally, serving to counterbalance any pivoted vehicle closures, such as as trunk or hatchback lids.

BACKGROUND OF THE INVENTION

A variety of attempts have been made in the past to implement the loading of articles into a vehicle compartment.

Thus, Gordos in U.S. Pat. No. 4,221,528 has provided attachment channels secured to a trunk lid from which telescoping bars may be extended to support hook and tackle arrangements to facilitate lifting of an article into the trunk.

Mann in U.S. Pat. No. 4,127,200 discloses a crane positioned within the trunk compartment for use in lifting articles into the trunk after the lid is lifted.

Riley in U.S. Pat. No. 4,406,574 shows another variant of a crane arrangement in a car trunk.

These prior art devices as above discussed are relatively complex, and employ structures such as the cranes of Riley and Mann, or the slide bars of Gordos which occupy storage capacity in the vehicle.

BRIEF DESCRIPTION OF INVENTION

It is with the above considerations in mind that the present improved means including both method and apparatus has been evolved, serving to permit the use of the vehicle lid, be it a trunk lid, engine compartment hood, or a hatchback lid as a lever arm to implement movement of a load. Further, the improved attachment may serve to provide desired vehicle lid counterbalancing when not employed for lifting purposes.

It is accordingly among the primary objects of this invention to provide improved means facilitating the loading of a vehicle compartment.

Another object of the invention is to provide an improved method for implementing vehicle loading.

A further object of the invention is to provide an attachment for a vehicle trunk lid or hatchback lid to implement use of the lid as a lifting lever for loads to be stored in the vehicle.

A further object of the invention is to provide a method whereby a trunk or hatchback lid may be employed as a lift lever.

It is also an object of the invention to provide an improved vehicle lid counterbalance.

These and other objects of the invention which will become hereafter apparent are achieved by providing fixed capacity energy storing means preferably in the form of a fixed charge member, and variable capacity energy storing means in the form of a variable charge chamber, arranged in a piston-cylinder assembly having the variable charge fluid chamber in which the entry of fluid acts as force applying means, and the fixed charge fluid chamber filled with a compressible fluid, such as a gas, acting as distensible-compressible means for positioning between a vehicle compartment lid such as a trunk lid or hatchback lid and the vehicle. Distending means acting as actuating or operating means for the piston-cylinder assembly are formed by a fluid system which permits fluid flow to the variable charge chamber in the piston-cylinder assembly to transmit force through the fixed charge chamber to cause the piston to extend, causing the lid to be lifted. Alternatively, upon permitting fluid flow from the piston-cylinder assembly, the gas in the fixed charge fluid chamber of the assembly may act as a counterweight or shock absorber for the weight of the lid. Load engaging means are secured to the lid, preferably at the free end thereof, and may take the form of a hook, clamp, or any suitable load engaging members. The fluid system provided for actuating the piston-cylinder assembly is coupled to a fluid source and pump, which may be a part of some fluid actuating system in the vehicle. As is apparent to those skilled in the art, the term fluid may embrace liquids or gasses, though a hydraulic system and/or combined hydraulic/gas system is here illustratively disclosed.

A method is also disclosed implementing the use of a piston-cylinder assembly coupled to a vehicle to provide the dual function of positively lifting the lid enabling its use as load lifting lever, or alternatively counterbalancing the weight of the lid.

A feature of the invention resides in the use of a fluid actuated piston-cylinder assembly to serve the dual function of providing a counterweight for the weight of the vehicle lid, or alternatively to positively lift the vehicle lid and attached load.

Another feature of the invention resides in the fact that the components of the assembly and fluid system lend themselves to positioning between the vehicle side walls.

BRIEF DESCRIPTION OF THE DRAWINGS

The specific details of the invention and their mode of functioning will be described in clear, concise and exact terms, so as to enable those skilled in the art to practice the invention in conjunction with the accompanying drawings wherein.

DESCRIPTION OF PREFERRED EMBODIMENT

Figure 1:
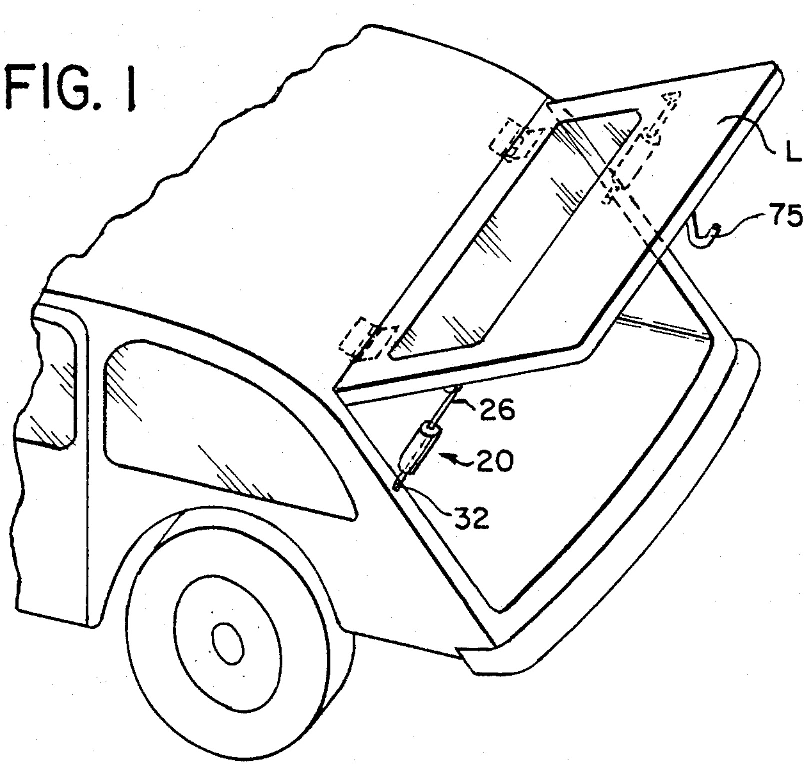
FIG. 1 is perspective view of the rear end of a hatchback vehicle, showing the hatchback in raised position to implement vehicle loading.
Figure 2:
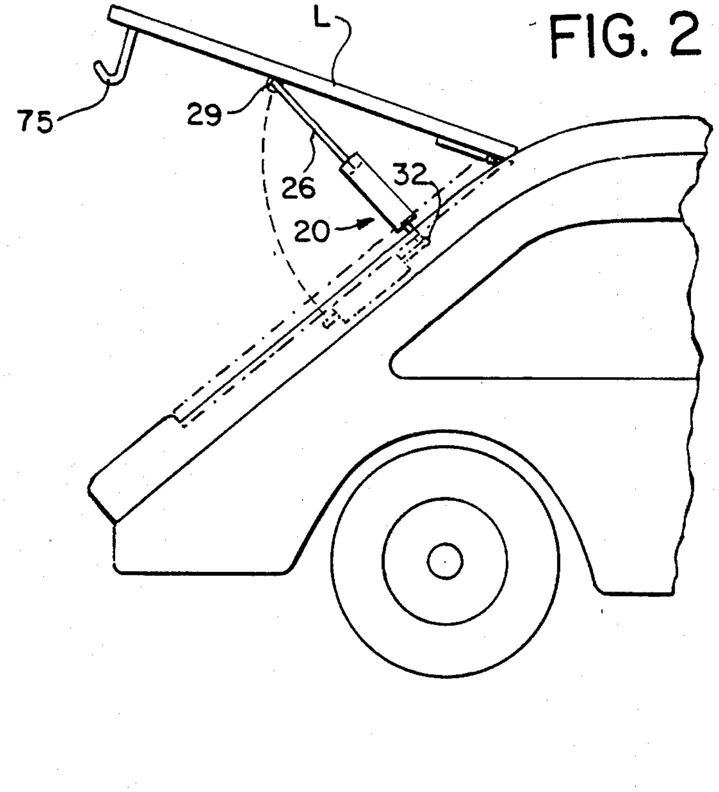
FIG. 2 is an elevational view, showing the hatchback of FIG. 1 in a raised position, indicating the movement from the dotted line position to the solid line raised open position.
Figure 3:
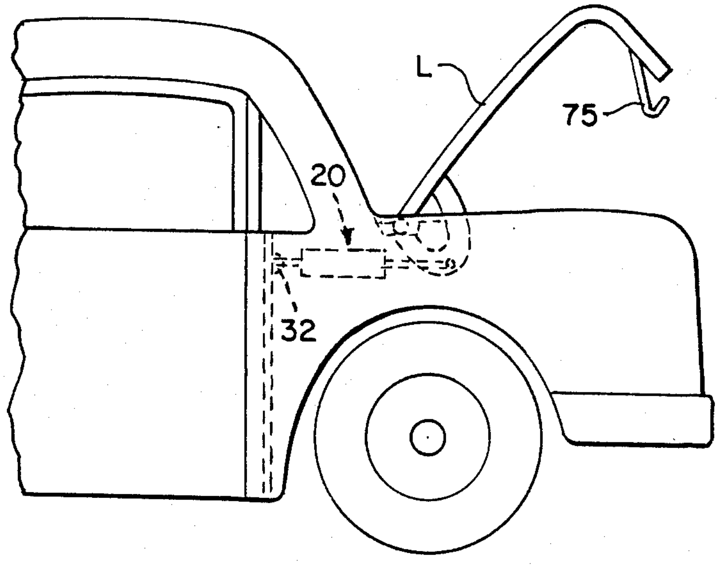
FIG. 3 is an elevational view of a vehicle, showing a trunk lid in connection with which the invention has been employed.
Figure 4:
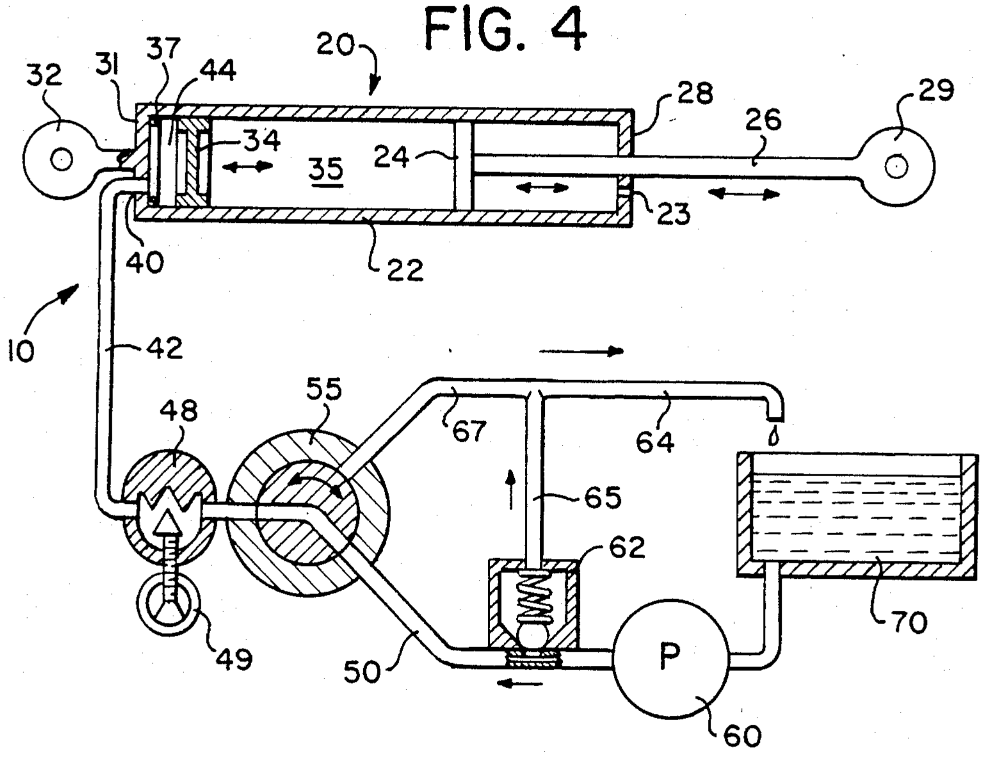
FIG. 4 is a schematic view of the piston-cylinder assembly and a suggested fluid system employable as operating means for distending the piston-cylinder assembly.

As illustratively shown in the drawings, the improved counterbalance-load lifter 10 has been provided for use on a hatchback vehicle as in FIGS. 1 and 2, or on a trunk lid as in FIG. 3. The counterbalance-load lifter, as best seen in FIG. 4, is preferably formed by a piston-cylinder assembly 20, providing distensible-compressible force applying means. The piston-cylinder assembly 20 comprises a cylinder 22 having piston 24 freely slidable therein coupled to a piston rod 26 extending from the piston 24 through cylinder end 28 of the cylinder 22, which is shown as formed with vent 23. A pivot connection 29 is formed on the free end of piston rod 26 to the right, as viewed in FIG. 4.

Arranged at the end 31 of cylinder 22 opposed to piston rod end 28 is a cylinder pivot connection 32, as seen to the left in FIG. 4.

Within cylinder 22 is a slide diaphragm 34 positioned for reciprocation in cylinder 22, forming a closed fixed charge compressible fluid (preferably gas) filled chamber 35 between piston 24 and diaphragm 34. A sealing seat 37, in the form of an O ring or the like is illustratively shown as positioned against the cylinder end 31 and provides a bearing surface for diaphragm 34 when it is displaced to the left.

A fluid opening 40 is formed in the cylinder end 31, and fluid conduit 42, preferably formed of flexible tubing, is connected to this cylinder opening 40, and leads from open variable charge fluid cylinder chamber 44 (as contrasted with closed fixed charge compressible fluid chamber 35) to flow control valve 48, which may be selectively opened or closed by means of control handle 49. Control of valves 48 and 55, as will be apparent to those skilled in the art, may be either manual, or remote controlled by means of any suitable linkage or remote control apparatus.

Fluid supply path 50 extends from control valve 48 through selective delivery valve 55 to pump 60. A bypass valve 62 is provided to permit diversion of fluid from pump 60 to return line 64 via branch 65. Similarly, selective delivery valve 55 can permit diversion of fluid from supply line 50 through return branch 67 to return line 64, leading any return fluid to an appropriate reservoir 70.

The above described components may, as will be understood by those skilled in the art, be readily installed in a vehicle, providing either an independent fluid system, or by coupling the piston-cylinder assembly 20 via suitable flow control valves 48, selected delivery valves 55 and bypass valves 62 to such pumps as are available in the vehicle. Pumps such as employed for power steering or power brakes may readily be utilized to provide desired driving pressure. Alternatively, a pump 60 may be separately provided, arranged as desired, either in the engine compartment or the trunk of the vehicle. Pivot connections 29 and 32 are employed for fastening the piston cylinder assembly 20 in position. In the illustrated embodiments, pivot connection 29 and the piston rod 26 are shown in FIGS. 1, 2 and 3 as secured to the lid L of the vehicle. While the cylinder pivot connection 32 is shown as secured to some portion of the vehicle body. Load engaging means, illustratively shown in the form of hook 75 is secured at some portion of the free end of the lid L.

OPERATION

In use, the components are fabricated employing conventional fabrication techniques, and the piston-cylinder assembly 20 is mounted with one end connected to the vehicle lid to be raised, and the other end connected to the vehicle body. Appropriate fluid connections are extended as described to a fluid system, and the necessary controls for the valve and pump are arranged preferably adjacent the trunk or hatchback opening, but obviously subject to positioning at any other desired point in or out of the vehicle.

Either two piston-cylinder assemblies as in FIG. 1 may be employed, or, as will understood by those skilled in the art, a single piston cylinder assembly may be utilized, or more than two may be utilized.

In use, remote, key operated switches may be employed to operate the valves, and a safety switch can be added to defeat the valve switches when the hatchback or trunk is locked.

When lifting, flow control valve 48 is initially closed, while selective delivery valve 55 is oriented to connect supply pipe 50 to return branch 67, and pump 60 is turned on. In this orientation, all of the fluid from the pump 60 will be returned to the reservoir 70.

As the head of pressure is built up, valve 48 is gradually opened to allow fluid to enter the flexible supply line 42 to open variable charge cylinder chamber 44. The closed fixed charge fluid chamber 35 between diaphragm 34 and piston 24 is loaded with a gas under sufficient pressure to maintain a separation between piston 24 and diaphram 34 under the weight of the supported lid. Thus, after the fluid pressure builds up in open variable charge chamber 44, diaphragm 34 will initially move to the right, as viewed in FIG. 4, further compressing the gas in closed fixed charge chamber 35, and ultimately effecting movement of piston 24 to move piston rod 26 to cause the vehicle lid L to lift. When the pressure has caused maximum lifting of the lid, any excess pressure produced by pump 60 will be bypassed through pressure relief valve 62 to return line 64 and the reservoir 70.

Valve 48 may then be shut to positively maintain the lid or hood in an up position with a load attached.

During the lifting process, and if the vehicle is moved with a load in elevated position, the compressibility of the fluid (preferably gas) in fixed charge chamber 35 acts as a shock absorber to cushion the load and structural parts.

When the piston-cylinder assembly 20 is not being employed for lifting purposes, the hermetically sealed closed fixed charge chamber 35 provides counterbalancing. In this mode, the flow control valve 48 is open, the rotary valve 55 is turned so that the supply line 42 is connected via return branch 67 to return line 64, and the pump 20 is turned off. The weight of the lid moves piston 24 to the left, bringing diaphragm 34 up against seal 37, displacing the fluid from open variable charge chamber 44 through line 42 back through valve 48 to flow control valve 55 to the return line 64.

The above disclosure has been given by way of illustration and elucidation, and not by way of limitation, and it is desired to protect all embodiments of the herein disclosed inventive concept within the scope of the appended claims.

What is claimed is:

1. A vehicle loading attachment for vehicles having a hinged closure lid overlying an opening of a storage area in the vehicle, said attachment comprising a piston-cylinder assembly having opposed ends and a piston rod extensible from one end; a pivot connection at each end of said piston-cylinder assembly, one pivot connection couplable to the vehicle body adjacent the opening to the storage area, the other pivot connection couplable to the closure lid; distending means for extending the piston rod of said piston-cylinder assembly from the cylinder of said piston-cylinder assembly; load engaging means secured to the closure lid; and control means for selectively actuating said distending means to control piston rod extension to selectively raise said lid, whereby a load engaged by said load engaging means may be selectively lifted by the closure lid.

2. A vehicle loading attachment as in claim 1, in which said piston-cylinder assembly is fluid actuated.

3. A vehicle loading attachment as in claim 2, in which said fluid is a hydraulic fluid, and said distending means comprise a fluid pump coupled to a fluid supply to said piston-cylinder assembly.

4. A vehicle loading attachment as in claim 3 in which said fluid pump is also employed in another fluid system of the vehicle.

5. A method of facilitating lifting loads into a vehicle having a hinged lid overlying an opening of a storage area in the vehicle, said method comprising the steps of securing a fluid actuated piston-cylinder assembly between the lid and a portion of the vehicle body; coupling the piston-cylinder assembly to a fluid source; and providing a load engaging means on the lid, whereby upon direction of fluid to the piston-cylinder, the lid may be raised along with any load engaged thereby.

6. A method as in claim 5 in which said piston-cylinder assembly is fluid actuated.

7. Vehicle lid counterbalancing-lifting means for selectively counterbalancing the weight of a vehicle lid or lifting the lid to expose the interior of the vehicle covered by the lid, said counterbalancing-lifting means comprising:

distensible-compressible means positioned between the lid and the vehicle, and operating means for causing distension of said distensible-compressible means, or permitting compression thereof against the weight of the lid.

8. Vehicle lid counterbalancing-lifting means as in claim 7, in which said distensible-compressible means comprise a piston-cylinder assembly, one end of which is coupled to the lid to be lifted, and the other end of which is coupled to the vehicle.

9. Vehicle lid counterbalancing-lifting means as in claim 8, in which said operating means comprise a fluid system coupled to said piston-cylinder assembly to direct and receive fluid to and from same.

10. In a vehicle having a hinged lid covering an opening to an interior part of the vehicle, means implementing the use of the lid as a lever arm to facilitate raising a load for positioning into said vehicle, said means comprising: force applying means for selectively applying a lifting force to the lid; article engaging means on said lid; and actuating means coupled to said force applying, means for selectively applying force to the lid to lift same along with any load engaged by said article engaging means whereby a load may be lifted to a position for positioning in the vehicle.

11. In a vehicle as in claim 10, in which said force applying means includes force resisting means which may be selectively actuated to exert forces in opposition to the weight of the lid.

12. In a vehicle as in claim 10, in which said force applying means comprise a piston-cylinder assembly, and said actuating means comprise a fluid system including a pump for selectively driving fluid to said piston-cylinder assembly.

13. In a vehicle as in claim 10, in which the pump of said fluid system is employed to provide fluid under pressure to some other vehicle system, such as power steering.

14. A counterbalance-load lifter for vehicle compartment lids implementing use of the lid as a lever arm to selectively facilitate raising a load into the vehicle compartment or counterbalance the weight of the lid, said counterbalance-load lifter comprising:

a cylinder assembly securable between the lid or vehicle body;

a piston in said cylinder;

a piston rod coupled to said piston extending from one end of said cylinder and coupled to either the lid or vehicle body to which the cylinder assembly is not connected;

a fluid conduit coupled to and leading fluid to the other end of said cylinder remote from said piston rod;

pressure relief means accomodating any excess pressure in said conduit; and a source of fluid, whereby fluid may be selectively directed to said cylinder to cause the piston rod to be extended therefrom to cause lifting of the lid or the fluid in the cylinder may be drained in resisting the weight of the lid.

15. A counterbalance-load lifter as in claim 14, in which said pressure relief means comprise:

a flow control valve coupled to said conduit selectively controlling fluid flow through said conduit;

a fluid supply line coupled to said flow control valve directing fluid thereto for selective delivery to said fluid conduit;

a selective delivery valve in.said fluid supply line;

a fluid return line coupled to said selective delivery valve; and a fluid reservoir receiving fluid from said return line.

16. A counterbalance-load lifter for vehicle compartment lids implementing use of the lid as a lever arm to selectively facilitate raising a load onto the vehicle compartment or counterbalance the weight of the lid, said counterbalance-load lifter comprising:

a cylinder assembly;

a movable diaphragm in said cylinder;

a piston in said cylinder;

a piston rod coupled to said piston extending from said cylinder on the cylinder end remote from said diaphragm;

a closed compressible fluid filled chamber in said cylinder between said piston and said diaphragm;

a fluid conduit coupled to the cylinder end adjacent said seat;

an open incompressible fluid chamber in said cylinder separated from said closed chamber by said diaphragm and in fluid communication with said conduit;

a flow control valve coupled to said conduit selectively controlling fluid flow through said conduit;

a fluid supply line coupled to said flow control valve directing fluid thereto for selective delivery to said fluid conduit;

a selective delivery valve in said fluid supply line;

a fluid return line coupled to said selective delivery valve;

a bypass valve between said supply line and said return line;

a pump coupled to said supply line; and a fluid reservoir receiving fluid from said return line and coupled to and providing fluid to said pump, whereby upon selectively initiating and discontinuing operation of said pump, and positioning said flow control valve and delivery valve to selectively direct fluid to said cylinder, the lid may either be positively lifted by filling said open fluid chamber or a counterbalance for the lid may be provided by permitting said diaphragm to displace fluid from said open chamber through said conduit back to said reservoir.

17. A counterbalance-load lifter as in claim 16 in which said bypass valve acts as a relief valve to bypass excess fluid pressure from the pump to said reservoir.

18. A lid lifting and lid counterbalancing attachment for a vehicle having a hinged closure lid overlying an opening in the vehicle, said attachment comprising:

a fixed capacity energy storing means arranged between the lid and the vehicle body;

variable capacity energy storing means coupled to said fixed capacity means to apply a load thereto, which may be transmitted therethrough for application between the vehicle lid and body;

and means for selectively varying the energy supplied to said variable energy storing means; whereof upon application of energy to said variable energy storing means, a force may be transmitted to lift the lid.

19. A lid lifting and counterbalancing attachment for a vehicle having a hinged closure lid as in claim 18, in which said fixed capacity energy storing means is formed in a piston-cylinder assembly as a fixed charge fluid chamber; and said variable capacity energy storing means is formed in said piston cylinder assembly as a variable charge fluid chamber; and said means for selectively varying the energy supplied comprises a fluid supply system, one end of said piston cylinder assembly coupled to the vehicle, and the other end coupled to the vehicle lid.

* * * * *